United States Patent
Li

(10) Patent No.: US 12,105,381 B2
(45) Date of Patent: Oct. 1, 2024

(54) DISPLAY PANEL AND MANUFACTURING METHOD THEREOF

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Liang Li, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/440,729

(22) PCT Filed: Jul. 27, 2021

(86) PCT No.: PCT/CN2021/108675
§ 371 (c)(1),
(2) Date: Jan. 19, 2023

(87) PCT Pub. No.: WO2023/284007
PCT Pub. Date: Jan. 19, 2023

(65) Prior Publication Data
US 2024/0027839 A1    Jan. 25, 2024

(30) Foreign Application Priority Data
Jul. 16, 2021 (CN) .......................... 202110807372.5

(51) Int. Cl.
*G02F 1/1339*    (2006.01)

(52) U.S. Cl.
CPC .................................. *G02F 1/1339* (2013.01)

(58) Field of Classification Search
None
See application file for complete search history.

(56) References Cited

U.S. PATENT DOCUMENTS

| | | | |
|---|---|---|---|
| 2004/0125316 A1* | 7/2004 | Kim ...................... | G02F 1/1333 349/153 |
| 2011/0194062 A1* | 8/2011 | Lee ....................... | G02F 1/1339 349/149 |

(Continued)

FOREIGN PATENT DOCUMENTS

| | | |
|---|---|---|
| CN | 101614914 A | 12/2009 |
| CN | 101676776 A | 3/2010 |

(Continued)

OTHER PUBLICATIONS

Chinese Office Action issued in corresponding Chinese Patent Application No. 202110807372.5 dated Mar. 2, 2022, pp. 1-7.

(Continued)

*Primary Examiner* — Phu Vu
(74) *Attorney, Agent, or Firm* — PV IP PC Chung; Wei Te

(57) ABSTRACT

The present application discloses a display panel and a manufacturing method thereof. The display panel has a display area and a non-display area arranged around the display area. The display panel includes a first substrate, a second substrate, and a first seal, and a second seal disposed between the first substrate and the second substrate. The first seal is doped with conductors. In the present application, the first seal doped with the conductors is provided, and signal traces in the first substrate and a common electrode in the second substrate are conducted by the conductors.

19 Claims, 3 Drawing Sheets

(56) References Cited

U.S. PATENT DOCUMENTS

2014/0002778 A1    1/2014  Lin et al.
2019/0204638 A1*   7/2019  Park ..................... G02F 1/1333

FOREIGN PATENT DOCUMENTS

| | | |
|---|---|---|
| CN | 102243405 A | 11/2011 |
| CN | 102314013 A | 1/2012 |
| CN | 103926759 A | 7/2014 |
| CN | 104375330 A | 2/2015 |
| CN | 105093629 A | 11/2015 |
| CN | 108535921 A | 9/2018 |
| CN | 208805659 U | 4/2019 |
| JP | 2002341321 A | 11/2002 |

OTHER PUBLICATIONS

International Search Report in International application No. PCT/CN2021/108675, mailed on Feb. 25, 2022.

Written Opinion of the International Searching Authority in International application No. PCT/CN2021/108675, mailed on Feb. 25, 2022.

* cited by examiner

DISPLAY PANEL AND MANUFACTURING METHOD THEREOF

RELATED APPLICATIONS

This application is a Notional Phase of PCT Patent Application No. PCT/CN2021/108675 having international filing date of Jul. 27, 2021, which claims the benefit of priority of Chinese Patent Application No. 202110807372.5 filed on Jul. 16, 2021. The contents of the above applications are all incorporated by reference as if fully set forth herein in their entirety.

BACKGROUND OF INVENTION

Field of Invention

The present application relates to a field of display technology, in particular to a display panel and a manufacturing method thereof.

Description of Prior Art

A liquid crystal display panel (LCD) is generally composed of an array substrate, a color filter substrate, and a liquid crystal layer and a seal layer disposed between two substrates. The array substrate and the color filter substrate are manufactured separately. In addition, the array substrate and the color filter substrate are assembled to form a liquid crystal cell. The seal layer plays a sealing role, and gold balls in the seal layer play a role of conducting electrodes of the array substrate and the color filter substrate.

In current seal forming processes, it is necessary to first coat a seal. After the seal is applied, the gold balls are separately made into the seal layer by dotting. In order to improve stability of signal connections between the array substrate and the color filter substrate, an existing design usually increases a number of times for doting the gold balls, but this method will increase tact time and increase production cost.

SUMMARY OF INVENTION

The present application provides a display panel and a manufacturing method thereof, which can improve stability of the signal connection between the first substrate and the second substrate and reduce the tact time.

The present application provides a display panel having a display area and a non-display area arranged around the display area, wherein the display panel includes:
- a first substrate including a signal trace, wherein the signal trace is located in the non-display area;
- a second substrate disposed opposite to the first substrate, and including a common electrode;
- a first seal covering a part of the signal trace and doped with conductors, wherein the conductors conduct the signal trace to the common electrode; and
- a second seal disposed between the first substrate and the second substrate and located in the non-display area, wherein the second seal is a closed structure surrounding the display area, or the second seal and the first seal at least constitute a closed structure surrounding the display area.

Optionally, in some embodiments of the present application, the display area has a first side and a second side opposite to each other, and a third side and a fourth side opposite to each other, and the first side, the second side, the third side, and the fourth side are connected in sequence;
wherein signal trace includes a signal output line and at least one signal input line, the signal output line is connected to the signal input line; the signal output line is arranged around the second side, the third side, and the fourth side, and the signal input line is arranged around a part of the first side; and
wherein the first seal includes a first sub-seal part, and the first sub-seal part covers the signal output line.

Optionally, in some embodiments of the present application, the first substrate further includes an insulating layer, the insulating layer covers the signal trace, the insulating layer is provided with an opening, and an orthographic projection of the opening on the first substrate coincides with an orthographic projection of the signal output line on the first substrate, and the conductors are connected to the signal trace through the opening.

Optionally, in some embodiments of the present application, the display panel further includes at least one trace portion, the trace portion is located in the non-display area and is arranged adjacent to the first side, and the signal input line crosses the at least one trace portion; and
wherein the first seal further includes at least one second sub-seal part, the second sub-seal part covers a part of the signal input line and is offset from the trace portion.

Optionally, in some embodiments of the present application, the second seal includes a main seal, the main seal is a closed structure surrounding the display area, and the main seal is disposed between the first seal and the display area.

Optionally, in some embodiments of the present application, the second seal further includes a connecting seal, and the connecting seal is disposed adjacent to the first side; and
wherein the connecting seal includes a first part, and the first part connects the first sub-seal part and the second sub-seal part.

Optionally, in some embodiments of the present application, the connecting seal further includes a second part, and the second part is connected to an adjacent one of the first sub-seal part.

Optionally, in some embodiments of the present application, the connecting seal and the second sub-seal part are located on a same horizontal line.

Optionally, in some embodiments of the present application, the second seal further includes a third sub-seal part, and the third sub-seal part is connected between the main seal and the first sub-seal part and disposed adjacent to the first side.

Optionally, in some embodiments of the present application, the third sub-seal part is arranged as two third sub-seal parts, and one of the third sub-seal parts connects the main seal to the first sub-seal part located at the third side, and another one of the third sub-seal parts connects the main seal to the first sub-seal part located at the fourth side.

Optionally, in some embodiments of the present application, the second seal is a closed structure surrounding the display area, and the second seal is located at a peripheral side of the first seal away from the display area.

Optionally, in some embodiments of the present application, the second seal is disposed between the second sub-seal part and the first side, and the second seal extends in a direction parallel to the first side, opposite ends of the second seal are respectively connected to the second sub-seal part.

Optionally, in some embodiments of the present application, opposite ends of the second seal respectively overlap the first sub-seal part.

Optionally, in some embodiments of the present application, the second seal is disposed adjacent to the first side; and wherein the second seal includes a first part, and the first part connects the first sub-seal part to the second sub-seal part.

Optionally, in some embodiments of the present application, the second seal further includes a second part, and the second seal connects an adjacent one of the first sub-seal part.

Optionally, in some embodiments of the present application, the first substrate further includes an insulating layer and a transparent conductive layer, the insulating layer covers the signal trace, the insulating layer is provided with an opening, the opening exposes the signal trace, the transparent conductive layer is located in the opening, and the conductors are connected to the signal trace through the transparent conductive layer.

Optionally, in some embodiments of the present application, an orthographic projection of the opening on the first substrate coincides with an orthographic projection of the first seal on the first substrate.

Optionally, in some embodiments of the present application, supports are further provided in the first seal, and a mass ratio of the supports to the conductors is 1:1.5 to 1:4.

Optionally, in some embodiments of the present application, the supports are further provided in the second seal.

Optionally, in some embodiments of the present application, supports are provided in the second seal.

The present application provides a display panel and a manufacturing method thereof. The display panel has a display area and a non-display area arranged around the display area. The display panel includes a first substrate, a second substrate, and a first seal and a second seal disposed between the first substrate and the second substrate. The first seal is doped with conductors. In the present application, the first seal doped with conductors is provided to cover at least part of the signal traces in the first substrate, and the signal traces in the first substrate and the common electrode in the second substrate are conducted by the conductors. Since the conductors are directly doped in the first seal, a number of conductors is increased, thereby improving the stability of a signal connection between the first substrate and the second substrate, and reducing a tact time. Meanwhile, the second seal is set as a closed structure surrounding the display area, or the second seal and the first seal constitute at least a closed structure surrounding the display area, which can isolate water, oxygen, and impurities and improve the stability of the display panel.

BRIEF DESCRIPTION OF DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
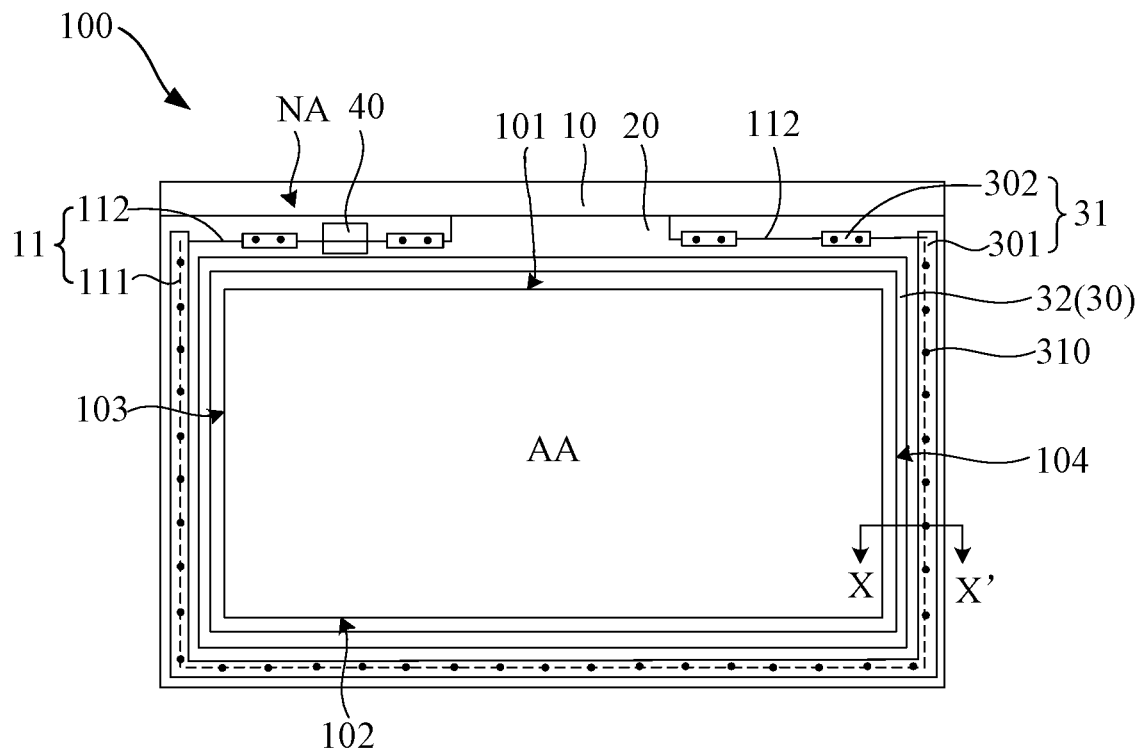
FIG. 1 is a schematic diagram of a first plane structure of a display panel provided by the present application.

In addition, it should be understood that the specific implementations described here are only used to illustrate and explain the application, and are not used to limit the application. In the present application, unless otherwise stated, the orientation words used such as "upper" and "lower" generally refer to the upper and lower directions of the device in actual use or working state, and specifically refer to the drawing directions in the drawings.

Figure 2:
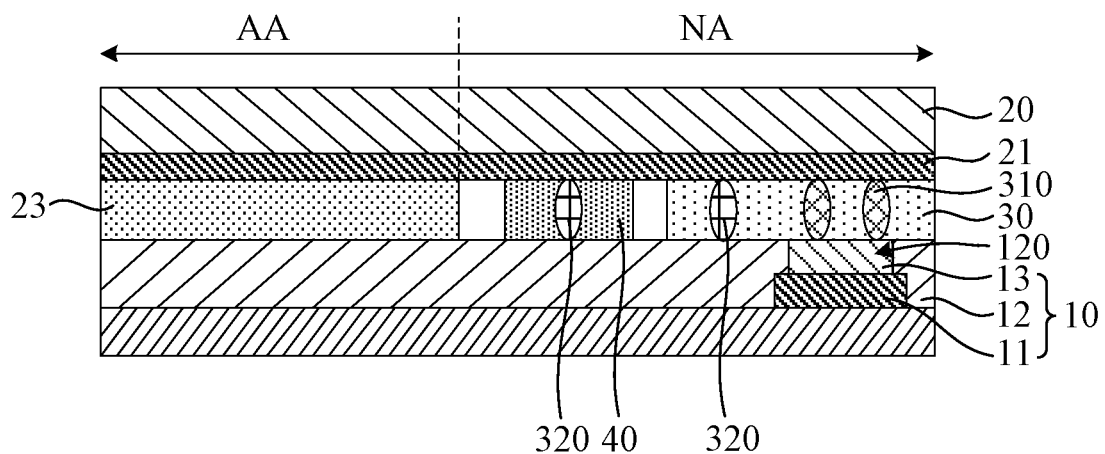
FIG. 2 is a schematic cross-sectional structural diagram taken along a line XX' of FIG. 1.

The present application provides a display panel and a manufacturing method thereof, which will be described in detail below. It should be noted that the order of description in the following embodiments is not intended to limit the preferred order of the embodiments. In addition, in the following embodiments, the description of each embodiment has its own emphasis. The parts that are not described in detail in an embodiment can be referred to the detailed descriptions in other embodiments Referring to FIG. 1 and FIG. 2, FIG. 1 is a schematic diagram of a first plane structure of a display panel provided by the present application. FIG. 2 is a schematic cross-sectional structural diagram taken along the an XX' of FIG. 1.

The present application provides a display panel 100. The display panel 100 has a display area AA and a non-display area NA arranged around the display area AA. The display panel 100 includes a first substrate 10, a second substrate 20, a first seal 31, and a second seal 32. The first substrate 10 includes a signal trace 11. The signal trace 11 is located in the non-display area NA. The second substrate 20 is disposed opposite to the first substrate 10. The second substrate 20 includes a common electrode 21. The first seal 31 covers a part of the signal trace 11 and is doped with conductors 310. The conductors 310 conduct the signal trace 11 to the common electrode 21. The second seal 32 is disposed between the first substrate 10 and the second substrate 20. The second seal 32 is located in the non-display area NA. The second seal 32 is a closed structure surrounding the display area AA, or the second seal 32 and the first seal 31 at least constitute the closed structure surrounding the display area AA.

In the present application, the first seal 31 doped with the conductors 310 is provided to cover the part of the signal trace 11. The signal trace 11 in the first substrate 10 and the common electrode 21 in the second substrate 20 are conducted through the conductors 310. Since the conductors 310 are directly doped in the first seal 31, a quantity is large, and there is no need to increase the quantity of the conductors 310 by dotting. Therefore, stability of signal connections between the first substrate 10 and the second substrate 20 is improved, a manufacturing process is simplified, and a manufacturing time is reduced. In addition, the second seal 32 is set as the closed structure surrounding the display area AA, or the second seal 32 and the first seal 31 at least constitute the closed structure surrounding the display area AA, which can seal the display area AA, thereby isolating water, oxygen, and impurities, and improving stability of the display panel 100.

The display panel 100 provided in the present application is a liquid crystal display panel. A working principle of the display panel 100 is to control rotation of liquid crystal molecules of the liquid crystal layer 23 by applying driving voltages on the first substrate 10 and the second substrate 20, thereby refracting light from a backlight module to produce images. The driving voltage required on the second substrate 20 is transmitted to the common electrode 21 through the signal trace 11.

The first substrate 10 is an array substrate. The first substrate 10 includes a first substrate, a thin film transistor layer, and a pixel electrode layer (not shown) that are sequentially stacked. The thin film transistor layer generally includes a gate metal layer, an active layer, and a source and drain metal layer. The signal trace 11 may be disposed in a same layer as the gate metal layer, or may be disposed in a same layer as the source and drain metal layer, or the signal trace 11 may be provided separately. The pixel electrode layer receives the driving voltage required by the first substrate 10 through the thin film transistor layer. A specific structure of the thin film transistor layer is a technology well known to those of ordinary skill in the art, and will not be repeated here.

The first substrate 10 also includes an insulating layer 12. The insulating layer 12 covers the signal trace 11 and plays a role of insulation protection. The insulating layer 12 may be a stacked structure of a plurality of the insulating layers. An opening 120 is defined on the insulating layer 12. The opening 120 exposes the signal trace 11. The conductors 310 are connected to the signal trace 11 through the opening 120.

Further, the first substrate 10 further includes a transparent conductive layer 13. The transparent conductive layer 13 is located in the opening 120. The transparent conductive layer 13 is in contact with the signal trace 11. The conductors 310 are connected to the signal trace 11 through the transparent conductive layer 13.

The signal trace 11 is usually a metal line with a width of several tens of micrometers and a thickness of several hundreds of micrometers. The signal trace 11 is arranged in the non-display area NA, and is located at an outermost of a bus module (busline). The signal trace 11 is arranged around at least a part of the display area AA, and can be specifically designed according to a structure of the display panel 100. The busline has a plurality of signal traces for providing driving signals for an array substrate row driving circuit (gate on array, GOA). For example, the busline includes a clock signal line, a DC high-level signal line LC, and a DC low-level signal line VSS, and details will not be repeated here for brevity.

A material used for the signal trace 11 can be any one of silver (Ag), aluminum (Al), nickel (Ni), chromium (Cr), molybdenum (Mo), copper (Cu), tungsten (W), or titanium (Ti). Aforementioned metals have good conductivity and a low cost, which can reduce a production cost while ensuring conductivity of the signal trace 11. A material used for the transparent conductive layer 13 can be any one of transparent metal oxide materials such as indium tin oxide (ITO), indium zinc oxide (IZO), indium aluminum zinc oxide (IAZO), antimony tin oxide (ATO), zinc oxide (ZnO), etc.

In the present application, by providing the transparent conductive layer 13 with a higher conductivity, a contact resistance between the conductors 310 and the signal trace 11 can be reduced, and conductivity between the signal trace 11 and the common electrode 21 can be enhanced.

In the present application, the opening 120 may be provided as one or more. An orthographic projection of the opening 120 on the first substrate 10 may coincide with an orthographic projection of the first seal 31 on the first substrate 10. That is, the first seal 31 is only disposed corresponding to the opening 120, so that the signal trace 11 that is not covered by the first seal 31 can be protected by the insulating layer 12. It is appreciated that since the first seal 31 is doped with the conductors 310, the quantity of the conductors 310 is larger, so an area of the opening 120 can be increased, thereby exposing more signal traces 11 and increasing a contact area between the first seal 31 and the conductors 310, thus further improving the stability of the signal connections between the first substrate 10 and the second substrate 20.

The second substrate 20 is a color filter substrate. A black matrix, an R/G/B color resist layer, a photo resist (PS) layer (not shown), and a common electrode 21 are usually arranged on the color film substrate. The common electrode 21 may be formed as a blanket film on an entire surface of the second substrate 20. Of course, the common electrode 21 can also be patterned according to a structure of a pixel electrode layer on the first substrate 10, which is not specifically limited here.

A material used for the common electrode 21 can be any one of transparent metal oxide materials such as indium tin oxide (ITO), indium zinc oxide (IZO), indium aluminum zinc oxide (IAZO), antimony tin oxide (ATO), zinc oxide (ZnO), etc. By controlling of a film forming process of a transparent material, resistivity and light transmittance of the common electrode 21 can be adjusted to improve a power supply capability of the common electrode 21 and light transmittance of the display panel 100.

A material of the first seal 31 is obtained by mixing the conductors 310 and a seal material in a certain mass ratio. The seal material can be epoxy resin, which has insulating properties. The conductors 310 are mainly formed by mixing gold balls and a seal. The gold balls, as a conductive filler, has an inner layer of a spherical and elastic polymer material with a uniform particle size, and an outer layer coated with nickel (Ni) and a layer of gold (Au) then plated on a surface of the Ni by electroless plating. Alternatively. a Ni layer and the Au layer are replaced with a silver (Ag) layer to form conductive particles. The polymer materials in the conductors 310 may be one or a combination of polystyrene, polyaniline, polypyrrole, polythiophene, and polyacrylic resin microspheres.

In the present application, supports 320 are also provided in the first seal 31. The supports 320 play a role of supporting the first substrate 10 and the second substrate 20 and maintaining a thickness of a liquid crystal cell (Cell Gap). The supports 320 may be silicon balls.

It is appreciated that the higher a proportion of the conductors 310 is, the better a conduction performance between the signal trace 11 and the common electrode 21 is, and the lower a defect rate of the display panel 100 is. Meanwhile, since a cost of the conductors 310 is higher, an overall cost is also higher accordingly, and vice versa. Therefore, there is a need to find a balance between them. Optionally, a mass ratio of the supports 320 to the conductors 310 in the present application is 1:1.5 to 1:4. For example, the mass ratio of the supports 320 to the conductors 310 is 1:2. As such, a thickness of the liquid crystal cell can be effectively maintained while ensuring a good conduction between the signal trace 11 and the common electrode 21.

Still referring to FIG. 1 and FIG. 2, in the present application, the display area AA has a first side 101 and a second side 102 opposite to each other, and a third side 103 and a fourth side 104 opposite to each other. The first side 101, the third side 103, the second side 102, and the fourth side 104 are connected in sequence. The signal trace 11 includes a signal output line 111 and at least one signal input line 112. The signal output line 111 is connected to the signal input line 112. The signal output line 111 is arranged around the second side 102, the third side 103 and the fourth side 104. The signal input line 112 is arranged around a part of the first side 101. The first seal 31 includes a first sub-seal part 301, and the first sub-seal part 301 covers the signal output line 111.

It is appreciated that a common voltage is input to the signal trace 11 from a source driving side in the display panel 100. In the present application, the source driving side is an end of the display panel 100 adjacent to the first side 101. The signal input line 112 extends from the source driving side to the first side 101 and is arranged around at least the part of the first side 101. That is, the common voltage is transmitted to the signal output line 111 by the signal input line 112.

When a size of the display panel 100 is small, only one signal input line 112 is required. When the size of the display panel 100 is large, a plurality of the signal input lines 112 may be provided to introduce the common voltage from the source driving side to the signal output line 111, thereby reducing an influence of a voltage drop. The present application is described by taking two signal input lines 112 as an example, but it cannot be regarded as a limitation to the present application.

Since the signal output line 111 is arranged around the second side 102, the third side 103, and the fourth side 104, it occupies a relatively large proportion in the signal trace 11. In the present application, the first sub-seal part 301 is provided to cover the signal output line 111, and the signal output line 111 and the common electrode 21 can be stably connected to each other through the conductors 310 doped in the first sub-seal part 301.

Optionally, when the first sub-seal part 301 covers the signal output line 111, the opening 120 may completely expose the signal output line 111. That is, the insulating layer 12 above the signal output line 111 is completely removed, thereby ensuring the contact area between the first seal 31 and the conductors 310, and further improving the stability of signal connections between the first substrate 10 and the second substrate 20.

Furthermore, the display panel 100 further includes at least one trace portion 40. The trace portion 40 is located in the non-display area AA. The trace portion is disposed adjacent to the first side 101. The signal input line 112 crosses the at least one trace portion 40. The first seal 31 further includes at least one second sub-seal part 302. The second sub-seal part 302 covers a part of the signal input line 112 and is offset from the trace portion 40.

It is appreciated that, since the source drive side is provided with access ports such as a power supply voltage input terminal and a data signal input terminal, signals are complicated. For example, taking an ultra-definition display panel with a resolution of 3840*2160 as an example, it is usually necessary to provide 12 driving chips on the source driver side. In a fan-out trace area that occupies the largest area, merely in order to access the data signal input by the driving chips, it is necessary to dispose close to 960*12 traces, which are distributed in 12 different areas on the source drive side at a certain interval. The trace portion 40 may include an above-mentioned fan-shaped trace located in one fan-out trace area. The trace portion 40 may also include a power trace and the like.

Specifically, when the trace portion 40 includes the fan-shaped trace or the power trace, the opening 120 in the insulating layer 12 need to be arranged to avoid the trace portion 40 to prevent a short circuit or disconnections of the fan-shaped trace and the power trace caused by etching and other processes. In this case, in the present application, the second sub-seal part 302 is offset from the trace portion 40, so that the second sub-seal part 302 only covers the signal input line 112 corresponding to the opening 120, which can reduce a proportion occupied by the first seal 31. Since a price of the conductors 310 doped in the first seal 31 is relatively high, the production cost can be reduced.

In addition, the trace portion 40 may also include pads, test lines, etc., which are provided on the first substrate 10 and are exposed to outside. The first seal 31 is doped with the conductors 310. Therefore, in the present application, the second sub-seal part 302 is offset from the trace portion 40, so that the second sub-seal part 302 is offset from exposed traces on the first substrate 10, which can also prevent the conductors 310 from causing a signal short circuit.

In the present application, the second seal 32 includes a main seal 30. The main seal 30 is arranged around a periphery of the display area AA. That is, the main seal 30 forms a closed structure around the display area AA. Because the first seal 31 is only arranged around a part of the display area AA, in the present application, by providing the main seal 30 arranged around the display area AA, a water and oxygen barrier effect of the seal can be enhanced, and a bonding force between the first substrate 10 and the second substrate 20 can be enhanced.

In the above, the main seal 30 is disposed between the first seal 31 and the display area AA. It can be known from above embodiment that the signal trace 11 is usually arranged outside the busline. That is, the signal trace 11 is located in an outer area of the non-display area NA. Therefore, there is a certain space between the signal trace 11 and the display area AA. In the present application, the main seal 30 is arranged between the first seal 31 and the display area AA, which can make full use of a space of the non-display area NA, and a bezel is narrowed to a greatest extent while blocking water and oxygen.

Of course, in the present application, the main seal 30 may also be located at a peripheral side of the first seal 31 away from the display area AA. That is, the main seal 30 also functions to close the first seal 31. Since the first seal 31 covers at least a part of the signal trace 11, and the first seal is doped with the conductors 310, the main seal 30 arranged outside the first seal 31 functions to seal the signal trace 11 and the common electrode 21, so that the signal trace 11 and the common electrode 21 that is not covered by the first seal 31 can be protected. Accordingly, the stability of the signal connections between the first substrate 10 and the second substrate 20 is further improved.

The second seal 32 is formed of the seal material. The seal material can be the epoxy resin, which has insulating properties. That is, the second seal 32 has no conductivity, and can prevent contact with the traces on the first substrate 10 or the second substrate 20, causing short circuits of different signals. The second seal 32 mainly functions to block water and oxygen and isolate impurities, so as to ensure the stability of the display panel 100. In addition, since the cost of the conductors 310 is relatively high, the second seal 32 and the first seal 31 constitute the closed structure around the display area AA to save the cost.

Optionally, the supports 320 are provided in the second seal 32. By providing the supports 320 in the second seal 32, an effect of supporting the first substrate 10 and the second substrate 20 can be further strengthened, thereby improving a vibration resistance of the display panel 100.

It should be noted that when the supports 320 are provided in the second seal 32, the conductors 310 are only required in the first seal 31. This solution can further increase a number of conductors 310, and meanwhile make the conductors 310 evenly distributed in the first seal 31, and further improve the stability of the signal connections between the first substrate 10 and the second substrate 20.

Figure 3:
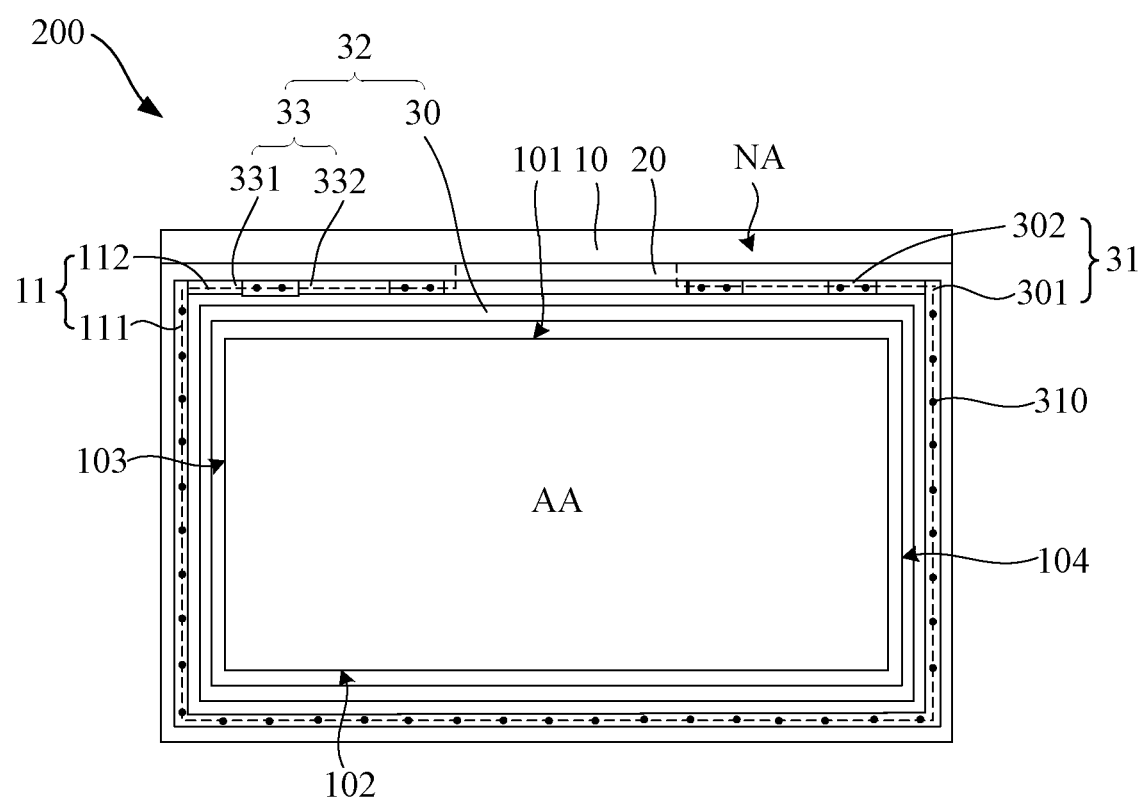
FIG. 3 is a schematic diagram of a second plane structure of the display panel provided by the present application.

Referring to FIG. 3, FIG. 3 is a schematic diagram of a second plane structure of the display panel provided by the present application. A difference from the display panel 100 in foregoing embodiments is that, in the display panel 200 of this embodiment, the second seal 32 further includes a connecting seal 33. The connecting seal 33 is arranged around the first side 101.

The connecting seal 33 includes a first part 331. The first part 331 is connected to the second sub-seal part 302 and the first sub-seal part 301.

Optionally, the connecting seal 33 further includes a second part 332. The second part 332 is connected to an adjacent one of the second sub-seal part 302.

It is appreciated that, in this embodiment, the second sub-seal part 302 is offset from the trace portion 40. Therefore, in an actual process, if the trace portion 40 and the second sub-seal part 302 are both multiple, there is a gap between adjacent ones of the second sub-seal parts 302. If the second sub-seal part 302 is arranged at a position close to a middle of the first side 101, there is a gap between the second sub-seal part 302 and the first sub-seal part 301.

Therefore, when there is a gap between the second sub-seal part 302 and the first sub-seal part 301, the present application connects the first sub-seal part 301 and the second sub-seal part 302 by providing the first part 331. When the second sub-seal parts 302 are multiple, adjacent ones of the second sub-seal parts 302 are connected by providing the second part 332. Numbers of the first part 331 and the second part 332 can be designed according to a specific structure of the second sub-seal part 302.

In the present application, by providing the connecting seal 33 to connect the first seal 31 into a closed structure, protection of the display panel 200 can be further enhanced. Meanwhile, due to a setting of the connecting seal 33, a supporting force received by each position of the first substrate 10 and the second substrate 20 is more balanced, thereby improving uniformity of a thickness of a cell.

Optionally, the connecting seal 33 and the second sub-seal 302 are located on a same horizontal line to reduce an occupied space of the second seal 32 and facilitate realization of a narrow bezel.

Of course, in the present application, when the connecting seal 33 is provided to connect the first seal 31 into the closed structure, the main seal 30 can be omitted, which further reduces the production cost. That is, the second seal 32 is merely an interval distributed structure that connect the first seal 31 into the closed structure. Alternatively, when the main seal 30 is set as the closed structure surrounding the display area AA, the connecting seal 33 can be omitted, which further reduces the production cost. That is, the second seal 32 is merely the closed structure surrounding the display area AA.

Figure 4:
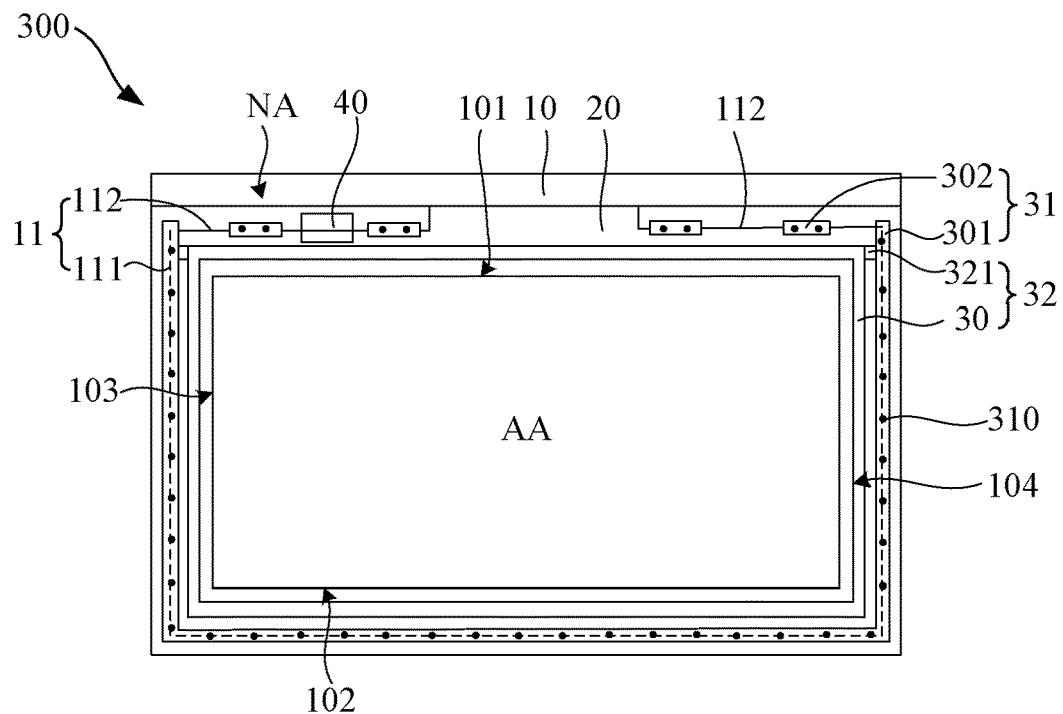
FIG. 4 is a schematic diagram of a third plane structure of the display panel provided by the present application.

Referring to FIG. 4, FIG. 4 is a schematic diagram of a third plane structure of the display panel provided by the present application. A difference from the display panel 100 in the foregoing embodiments is that, in the display panel 300 of this embodiment, the second seal 32 further includes a third sub-seal part 321. The third sub-seal part 321 is disposed between the main seal 30 and the first sub-seal part 301. The third sub-seal part 321 is disposed adjacent to the first side 101. The third sub-seal part 321 is connected to the main seal 30 and the first sub-seal part 301.

Specifically, the third sub-seal parts 321 is arranged as two third sub-seal parts 321. One of the third sub-seal parts 321 connects the main seal 30 and the first sub-seal part 301 located on the third side 103. Another third sub-seal part 321 connects the main seal 30 and the first sub-seal part 301 located on the fourth side 104. The third sub-seal part 321 may overlap the first sub-seal part 301, or may merely be in contact with and connected to the first sub-seal part 301.

It is appreciated that, since the second sub-seal part 302 is only arranged around a part of the first side 101, external moisture or impurities may easily corrode the second seal 32 and the display panel 300 through the source driving side. In this embodiment, the second seal 32 is set as the third sub-seal part 321 and the main seal the third sub-seal part 321 connects the main seal 30 and the first sub-seal part 301, which can improve a water and oxygen barrier capacity of the source driving side, thereby preventing water and oxygen or impurities from passing through a gap where the second sub-seal part 302 is not provided and entering into between the first sub-seal part 301 and the main seal 30. Therefore, paths of water and oxygen intrusion are reduced, and a stability of the display panel 300 is further improved.

Figure 5:
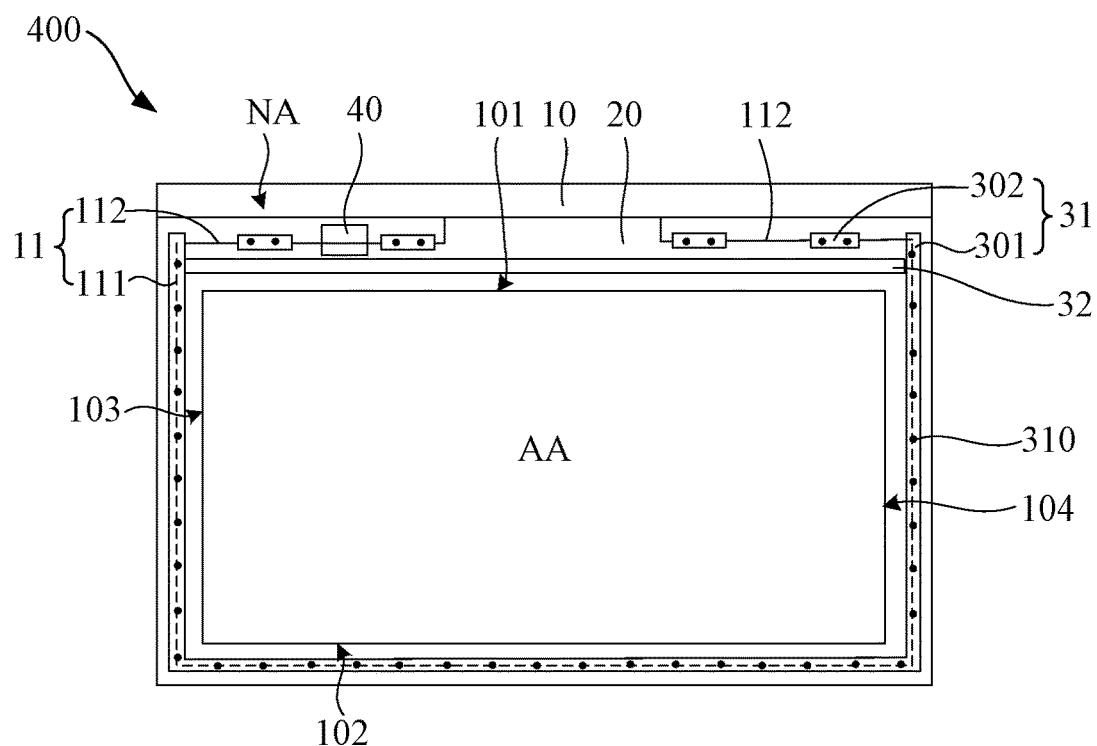
FIG. 5 is a schematic diagram of a fourth plane structure of the display panel provided by the present application.

Referring to FIG. 5, FIG. 5 is a schematic diagram of a fourth plane structure of the display panel 100 provided by the present application. A difference from the display panel 100 in the foregoing embodiments is that, in the display panel 400 of this embodiment, the second seal 32 is disposed between the second sub-seal part 302 and the first side 101. The second seal 32 extends in a direction parallel to the first side 101 until it is connected to the first sub-seal 301 located at the third side 103 and the fourth side 104. The second seal 32 may overlap the first sub-seal part 301, or it may merely be in contact with and connected to the first sub-seal part 301.

In this embodiment, the second seal 32 is connected to the first sub-seal part 301, so that the first seal 31 and the second seal 32 constitute a closed structure surrounding the display area AA. This solution can improve a water and oxygen barrier capacity of the first seal 31 and the second seal 32, and prevent water and oxygen or impurities from entering the display panel 400 through the second sub-seal part 302, thereby improving a stability of the display panel 400. Meanwhile, since the second seal 32 is only arranged around the first side 101, a seal structure is simple, a manufacturing process can be simplified, and the production cost can be reduced.

Correspondingly, in the present application, an above-mentioned display panel can be prepared by two-time coating. Specifically, please refer to FIG. 1 and FIG. 2 in conjunction.

First, a circle of the first seal material is applied to a position of the first substrate 10 or the second substrate 20 in the non-display area NA to form the first seal 31. In the present application, formation of the seal on the first substrate 10 is taken as an example for description, but it should not be regarded as a limitation of the present application.

The first seal 31 covers at least a part of the signal trace 11 to realize a connection between the conductors 310 and the signal trace 11. In a specific embodiment, a first seal material is coated on the first side 101 to form a plurality of second sub-seal parts 302 arranged at intervals. In addition, the second sub-seal parts 302 are offset from the trace portion 40. The first seal material is coated around the second side 102, the third side 103, and the fourth side 104 to form the first sub-seal part 301.

The first seal material may be obtained by mixing the conductors 310 and a seal material in a certain mass ratio.

The seal material can be epoxy resin, which has insulating properties. The conductors 310 are mainly formed by mixing gold balls and seal. The gold ball, as a conductive filler, has an inner layer of a spherical and elastic polymer material with a uniform particle size, and an outer layer coated with nickel (Ni) and a layer of gold (Au) then plated on a surface of the Ni by electroless plating. Alternatively, a Ni layer and the Au layer are replaced with a silver (Ag) layer to form conductive particles. The polymer materials in the conductors 310 may be one or a combination of polystyrene, polyaniline, polypyrrole, polythiophene, and polyacrylic resin microspheres.

Further, supports 320 can also be provided in the first seal 31. The mass ratio of the supports 320 to the conductors 310 is 1:1.5 to 1:4. As such, while ensuring a good conduction between the signal trace 11 and the common electrode 21, the thickness of the liquid crystal cell can be effectively maintained.

Then, a second seal 32 is formed on the non-display area NA of the first substrate 10 by coating. The second seal 32 may be a closed structure surrounding the display area AA. The second seal 32 and the first seal 31 may at least constitute the closed structure surrounding the display area AA.

The second seal 32 is formed of a second seal material. The second seal material is a seal material. The seal material may be epoxy resin, which has insulating properties.

Optionally, the supports 320 may also be provided in the second seal 32.

Specifically, as shown in FIG. 1, in some embodiments, the second seal material may be coated around the display area AA to form the second seal 32 with the closed structure disposed around the display area AA. The second seal 32 may be disposed between the first seal 31 and the display area AA. The second seal 32 may also be located outside the first seal 31.

In some embodiments, as shown in FIG. 3, the second seal material may be applied between the adjacent second sub-seal parts 302 and/or between the second sub-seal part 302 and the first sub-seal part 301, to form the connecting seal 33. Thus, the first seal 31 is formed into a closed structure through the connecting seal 33.

In some embodiments, as shown in FIG. 5, the second seal material may be coated between the first side 101 and the second sub-seal part 302 to form the second seal 32. The second seal 32 extends in a direction parallel to the first side 101 until it is connected to the second sub-seal 302 located at the third side 103 and the fourth side 104. Thus, the first seal 31 and the second seal 32 constitute the closed structure surrounding the display area AA.

Finally, a liquid crystal dropping device may be used to drop an appropriate number of liquid crystals in the closed structure enclosed by the first seal 31 and the second seal 32 to form the liquid crystal layer 23. The second substrate 20 is bonded to the first substrate 10 in a vacuum environment, and the seal is hardened and fixed by ultraviolet light irradiation and thermal curing (seal molding), thereby obtaining the display panel in any of above embodiments.

The present application provides a method of manufacturing a display panel. In this method, the first seal 31 doped with the conductors 310 is formed through a first coating process, and the conductors 310 conduct the signal trace 11 to the common electrode 21. Then, the second seal 32 and/or the connecting seal 33 are formed by a second coating process to form at least one closed structure surrounding the display area AA. As a result, by coating twice, a quantity of conductors 310 connecting the signal trace 11 and the common electrode 21 is increased, and signal connections between the first substrate 10 and the second substrate 20 is more stable, thereby alleviating crosstalk and improving display uniformity of the display panel. Meanwhile, compared with a method of increasing the quantity of conductors 310 by dotting, the present application can effectively simplify processes and reduce a tact time. In addition, the second seal 32 formed by two-time coating is a closed structure surrounding the display area AA, or the second seal 32 and the first seal 31 at least constitute the closed structure surrounding the display area AA, which can isolate water and oxygen and impurities to improve the stability of the display panel.

The display panel provided by the present application and its manufacturing method are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A display panel, having a display area and a non-display area arranged around the display area, wherein the display panel comprises:
    a first substrate comprising a signal trace, wherein the signal trace is located in the non-display area;
    a second substrate disposed opposite to the first substrate, and comprising a common electrode;
    a first seal covering a part of the signal trace and doped with conductors, wherein the conductors conduct the signal trace to the common electrode; and
    a second seal disposed between the first substrate and the second substrate and located in the non-display area, wherein the second seal is a closed structure surrounding the display area, or the second seal and the first seal at least constitute the closed structure surrounding the display area;
    wherein the display area has a first side and a second side opposite to each other, and a third side and a fourth side opposite to each other, and the first side, the third side, the second side, and the fourth side are connected in sequence;
    wherein the signal trace comprises a signal output line and at least one signal input line, the signal output line is connected to the signal input line; the signal output line is arranged around the second side, the third side, and the fourth side, and the signal input line is arranged around a part of the first side; and
    wherein the first seal comprises a first sub-seal part, and the first sub-seal part covers the signal output line.

2. The display panel according to claim 1, wherein the first substrate further comprises an insulating layer, the insulating layer covers the signal trace, the insulating layer is provided with an opening, and an orthographic projection of the opening on the first substrate coincides with an orthographic projection of the signal output line on the first substrate, and the conductors are connected to the signal trace through the opening.

3. The display panel according to claim 1, wherein the display panel further comprises at least one trace portion, the trace portion is located in the non-display area and is arranged adjacent to the first side, and the signal input line crosses the at least one trace portion; and wherein the first seal further comprises at least one second sub-seal part, the second sub-seal part covers a part of the signal input line and is offset from the trace portion.

4. The display panel according to claim 3, wherein the second seal comprises a main seal, the main seal is the closed structure surrounding the display area, and the main seal is disposed between the first seal and the display area.

5. The display panel according to claim 4, wherein the second seal further comprises a connecting seal, and the connecting seal is disposed adjacent to the first side; and
wherein the connecting seal comprises a first part, and the first part connects the first sub-seal part and the second sub-seal part.

6. The display panel according to claim 5, wherein the connecting seal further comprises a second part, and the second part is connected to an adjacent one of the first sub-seal part.

7. The display panel according to claim 6, wherein the connecting seal and the second sub-seal part are located on a same horizontal line.

8. The display panel according to claim 4, wherein the second seal further comprises a third sub-seal part, and the third sub-seal part is connected between the main seal and the first sub-seal part and disposed adjacent to the first side.

9. The display panel according to claim 8, wherein the third sub-seal part is arranged as two third sub-seal parts, and one of the third sub-seal parts connects the main seal to the first sub-seal part located at the third side, and another one of the third sub-seal parts connects the main seal to the first sub-seal part located at the fourth side.

10. The display panel according to claim 3, wherein the second seal is the closed structure surrounding the display area, and the second seal is located at a peripheral side of the first seal away from the display area.

11. The display panel according to claim 3, wherein the second seal is disposed between the second sub-seal part and the first side, and the second seal extends in a direction parallel to the first side, opposite ends of the second seal are respectively connected to the second sub-seal part.

12. The display panel according to claim 11, wherein opposite ends of the second seal respectively cross and overlap the first sub-seal part.

13. The display panel according to claim 3, wherein the second seal is disposed adjacent to the first side; and
wherein the second seal comprises a first part, and the first part connects the first sub-seal part to the second sub-seal part.

14. The display panel according to claim 13, wherein the second seal further comprises a second part, and the second seal connects an adjacent one of the first sub-seal part.

15. The display panel according to claim 1, wherein the first substrate further comprises an insulating layer and a transparent conductive layer, the insulating layer covers the signal trace, the insulating layer is provided with an opening, the opening exposes the signal trace, the transparent conductive layer is located in the opening, and the conductors are connected to the signal trace through the transparent conductive layer.

16. The display panel according to claim 15, wherein an orthographic projection of the opening on the first substrate coincides with an orthographic projection of the first seal on the first substrate.

17. The display panel according to claim 1, wherein supports are further provided in the first seal, and a mass ratio of the supports to the conductors is 1:1.5 to 1:4.

18. The display panel according to claim 17, wherein the supports are further provided in the second seal.

19. The display panel according to claim 1, wherein supports are provided in the second seal.

* * * * *